United States Patent [19]

Otorii

[11] Patent Number: 5,632,018
[45] Date of Patent: May 20, 1997

[54] ELECTRONIC MAIL SYSTEM

[75] Inventor: Keiichi Otorii, Kawasaki, Japan

[73] Assignee: Fujitsu Limited, Kanagawa, Japan

[21] Appl. No.: 120,966

[22] Filed: Sep. 13, 1993

[30] Foreign Application Priority Data

Jan. 18, 1993 [JP] Japan ................................. 5-006187

[51] Int. Cl.$^6$ ........................... G06F 13/00; G06F 13/38
[52] U.S. Cl. ................. 395/200.04; 395/200.12; 395/200.16
[58] Field of Search ........................... 395/200, 700, 395/200.03, 200.04, 200.12, 200.16; 369/514; 364/900, 551; 379/34

[56] References Cited

U.S. PATENT DOCUMENTS

| | | | |
|---|---|---|---|
| 4,977,520 | 12/1990 | McGaughey, III et al. | 364/521 |
| 5,040,141 | 8/1991 | Yatima et al. | 364/900 |
| 5,255,305 | 10/1993 | Sattar | 379/34 |
| 5,278,955 | 1/1994 | Forté et al. | 395/200 |
| 5,305,456 | 4/1994 | Bortana | 395/700 |
| 5,325,310 | 6/1994 | Johnson et al. | 364/514 |
| 5,333,266 | 7/1994 | Boaz et al. | 395/200 |

OTHER PUBLICATIONS

"Microsoft Mail (User's Guide) Electronic mail for Pc Networks" Microsoft, 1992, pp. 13–15, 25–45, 66–73, 88–89.

"Microsoft Mail (user's guide) Electronic Mail for PC Networks, Workstation Software for Windows and Presentation Mayer VCR 3.0", Microsoft, 1992, pp. 1–32.

PC Magazine, Apr. 30, 1991, v. 10, p. 138(2), "Tailor-made communications".

*Primary Examiner*—Larry D. Donaghue
*Assistant Examiner*—Mark H. Rinehart

[57] ABSTRACT

A user who received a broadcast message broadcasts a response answering the broadcast message. Sender Y of the broadcast message sends to an electronic mail system through the broadcast message together with identification information on addressees of the broadcast message, and then issues a request to broadcast the message. The electronic mail system sends the message together with the identification information on the addressees of the message to each terminal of users A, B and C as specified by sender Y. On receiving the message, user A generates a response answering the received message, and sends it to the electronic mail system. User A also sends to the electronic mail system the identifiers of users B and C as identification information on addressees of the response according to the received identification information on the addressees of the broadcast message, and then requests the system to broadcast the response. Then, the electronic mail system sends the response to users B and C and sender Y. Thus, user A can be informed of other receivers of the broadcast message and sends the response to users B and C without a troublesome operation of inputting addresses of the response.

8 Claims, 7 Drawing Sheets

5,632,018

ELECTRONIC MAIL SYSTEM

BACKGROUND OF THE INVENTION

1. Field of the Invention

The present invention relates to an electronic mail system, and more specifically to a broadcast system for broadcasting a response to answer a broadcast message in an electronic mail system.

2. Background of the Invention

Recently, personal computers and data terminal units have been reduced both in price and size, thereby becoming more and more popular. As a result, electronic mail systems have been increasingly used as an important communication method for industrial and social activities.

An electronic mail system connects personal computers and data terminal units in a communication network in order to transmit messages as mail. There are various electronic mail systems for exchanging messages as electronic mail through various media. For example, communication systems are used as the parent bodies for voice mail systems, facsimile mail systems, etc., while computer systems are used as the parent bodies for "pure" electronic mail systems using encoded characters such as text mail, personal computer communication systems, etc.

FIG. 1 shows the concept of a conventional electronic mail system. The basic function of the electronic mail system 140 is to deliver a message to an addressee through a personal electronic mail box. An electronic mail system does not send a message directly to a designated terminal unit. As shown in FIG. 1, a sender 110 sends a message to the electronic mail system 140 for a receiver 130 through a communication circuit 120, and the receiver 130 receives through the electronic mail system 140 the message addressed to the receiver 130.

At present, the electronic mail system provides basic services of "send", "receive", "response", "transfer", "save", and "delete". Additionally provided services are "broadcast", "acknowledge", "circulate", etc.

Among the above listed additional services, the broadcast service sends the same message to a plurality of addressees by designating a plurality of receivers. If the number of addressees is very large, then the plurality of addressees are registered as one group having an appropriate group name, and the group name is chosen as a receiver when a message is broadcasted. Thus, the same message can be delivered to all members in the group.

In the conventional electronic mail system, further convenient services are being demanded by the increasing number of its users.

Thus, electronic mail system servers are requested to develop and provide additional functions to meet users' requests. They can increase the number of users and the frequency of uses if they successfully provide the additional functions.

The conventional electronic mail system has a disadvantage in that, when the above described broadcast service is performed, the users involved are required to perform additional operations in order to send back a response to a broadcast message, that is, an answer, comment, etc. not only to the sender of the broadcast message but also to other addressees of the broadcast message.

That is, to realize the broadcast of a response to a broadcast message, there are at present alternatives to the following methods.

1. A sender of a response sends a response to all the other broadcast addressees described in the received broadcast message, or 2. On receiving a response, the sender of a broadcast message transfers the response to all the broadcast addressees other than the sender of the response.

As explained above, the broadcast of a response requires a troublesome operation of inputting the addressees of the response. Moreover, method 2 above takes time in notifying a response and causes the problem that the sender of the response can not certify the completion of the transfer.

SUMMARY OF THE INVENTION

The present invention aims at providing an electronic mail system in which, on receiving a broadcast message, a receiver of the broadcast message can easily send a response not only to the sender of the broadcast message but also to all the other receivers of the broadcast message.

The electronic mail system according to the present invention comprises a broadcasting unit for sending a message with broadcast addresses received from a first user to users with the broadcast addresses, a response receiving unit for receiving a response to the message from a second user who received the message from the broadcasting unit, and a response sending unit for sending the response received by the response receiving unit to the first user and the users with the broadcast addresses.

In a preferred embodiment, for example, the broadcasting unit sends the broadcast addresses to the second user as response addresses. The second user selects response broadcast addresses of the response from among the broadcast addresses sent from the broadcasting means. The response receiving unit receives the selected response broadcast addresses from the second user and the response sending unit sends the response to users with the response broadcast addresses.

According to the above composition, all of the users involved in the electronic mail system can easily send a response answering a broadcast message that they have received, not only to the sender of the broadcast message but also to the other receivers of the broadcast message.

In other words, the users of the electronic mail system are free from the troublesome input operation, thereby easily broadcasting a response with answers the broadcast message.

DESCRIPTION OF THE PREFERRED EMBODIMENTS

An embodiment of the present invention is explained as follows by referring to the attached drawings.

Figure 1:
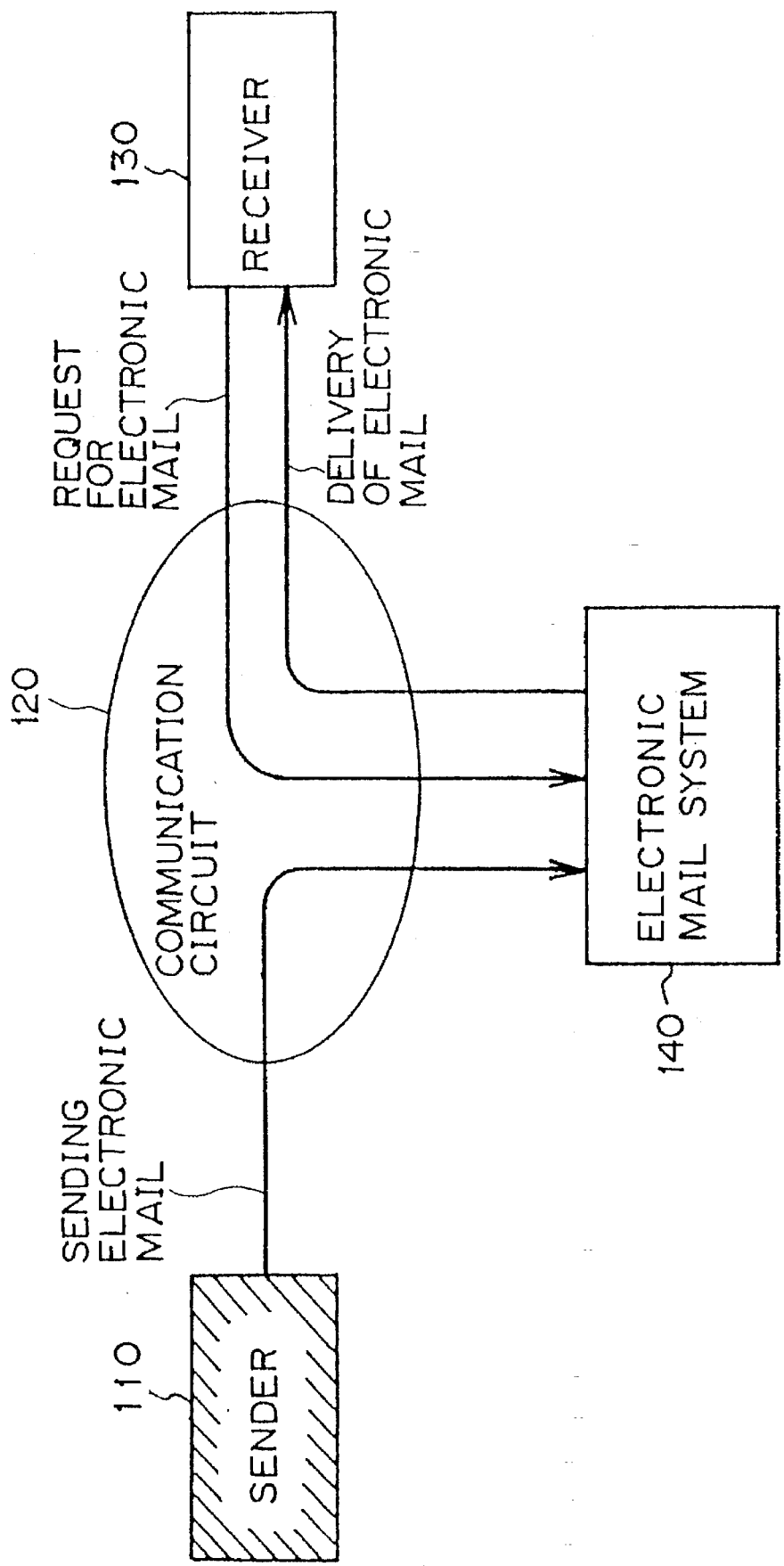
FIG. 1 shows the concept of an electronic mail system.
Figure 2:
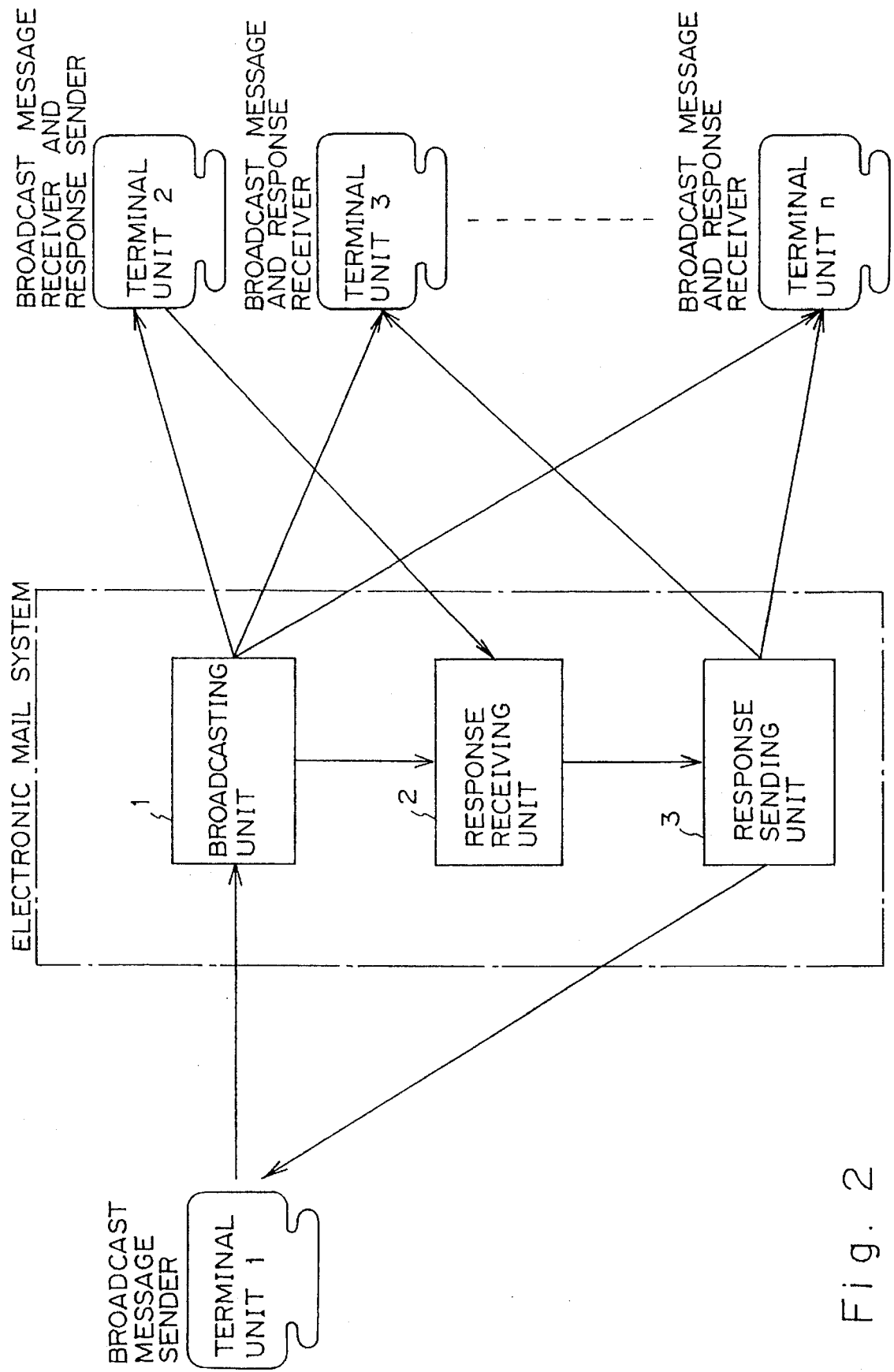
FIG. 2 is the block diagram showing the principle of the electronic mail system according to the present invention.

FIG. 2 is a block diagram showing the principle of the electronic mail system according to the embodiment.

In FIG. 2, each function of a broadcasting unit 1, a response receiving unit 2 and a response sending unit 3 is realized by a program on a server including the electronic mail system; a broadcasting unit 1 sends a message with broadcast addresses received from a terminal unit of a first user (terminal unit 1), that is, a sender of the broadcast message, together with the information on the addressees of the broadcast message to terminal units of the addressees of the broadcast message (terminal units 2, 3, . . . , n). At this time, the first user notifies the broadcasting unit 1 of the permission for broadcasting a response answering the broadcast message, then the broadcasting unit 1 sends the permission notification to the response receiving unit 2 and the response sending unit 3.

Then, the response receiving unit 2 receives a response answering the broadcast message from a terminal unit of a second user (terminal unit 2) who received the broadcast message from the broadcasting unit 1. At this time, the second user selects broadcast addressees for the response from among the addressees of the broadcast message, sends the selected addressees to the response receiving unit 2, and requests to broadcast the response.

On receiving the request to broadcast the response, the response sending unit 3 sends the response received by the response receiving unit 2 to the terminal units of the first user and other addressees of the broadcast message (terminal units 1, 3, . . . , n).

Figure 3:
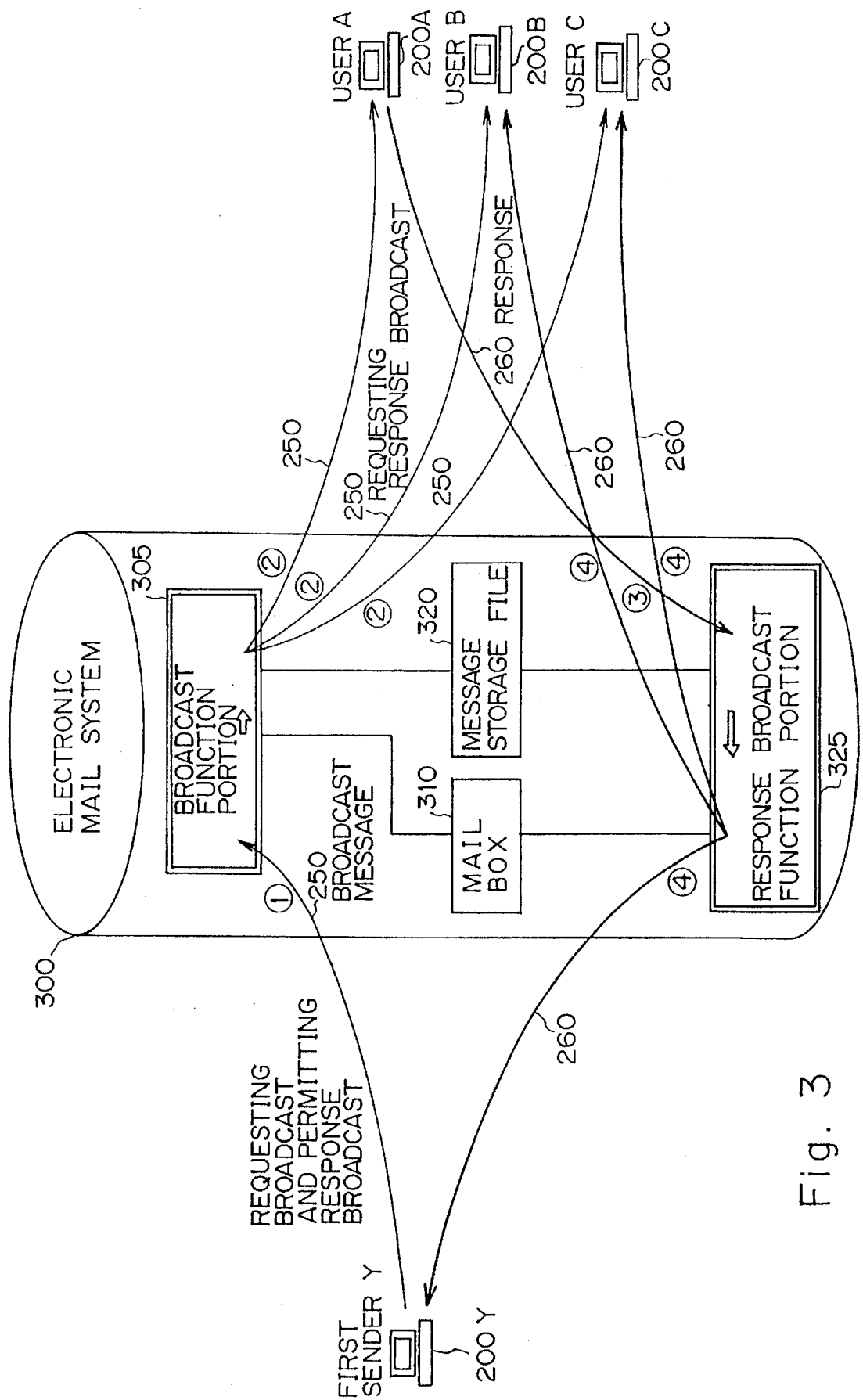
FIG. 3 is the block diagram for explaining an embodiment of the electronic mail system according to the present invention.

FIG. 3 shows the broadcasting method for use in an electronic mail system 300 which is an embodiment of the present invention. The electronic mail system 300 is realized with computer resources in the server and is connected to user terminal units, and comprises a mail box 310 for managing message numbers of messages received for each user and a message storage file 320 for storing the messages, providing a broadcast function and an additional function of a "response broadcast".

In FIG. 3, the first message sender Y broadcasts a message generated by him or her to users A, B and C through the electronic mail system 300. Then, receiver A, which is one of the addressees of the broadcast message, sends a response answering the broadcast message received from the first sender Y to not only the sender Y but also receivers B and C, that is, other addressees of the broadcast message through the electronic mail system 300.

Next, the method of electronic mailing based on the additional "response broadcast" function according to the above described electronic mail system 300 is explained further in detail by referring to FIG. 3.

First, the first sender Y sends to the electronic mail system 300 a broadcast message 250 together with identification information on the broadcast addresses designating users A, B and C as addressees of the broadcast message from the terminal unit 200Y. The broadcast function portion 305 of the electronic mail system 300 stores in the message storage file 320 the broadcast message 250 received from the first sender Y and the identification information on the broadcast addresses, and registers message number of the broadcast message 250 in the mail box according to the identification information on the broadcast addresses. At this time, the first sender Y issues a request to the electronic mail system 300 to broadcast the message, and give a permission for broadcasting a response when inquired by the electronic mail system 300.

On receiving the permission for broadcasting a response from the sender Y, the broadcast function portion 305 sends the broadcast message 250 stored in the message storage file 320 to the terminal units 200A, 200B and 200C of users A, B and C as designated according to the identification information on the broadcast addresses.

Next, on receiving the message 250 from the first sender Y, receiver A sends to the electronic mail system 300 a response 260 answering the message and the identification information on the response broadcast addresses designating users Y, B and C as addressees of the response. At this time, user A issues a request to the electronic mail system 300 to broadcast the response.

On receiving from user A a request for broadcasting the response, the response broadcast function portion 325 of the electronic mail system 300 takes out the response 260 from the message storage file 320 and sends it to the terminal unit 200Y of the first sender Y and the terminal units 200B and 200C of users B and C according to the identification information on the response broadcast addresses.

Figure 4:
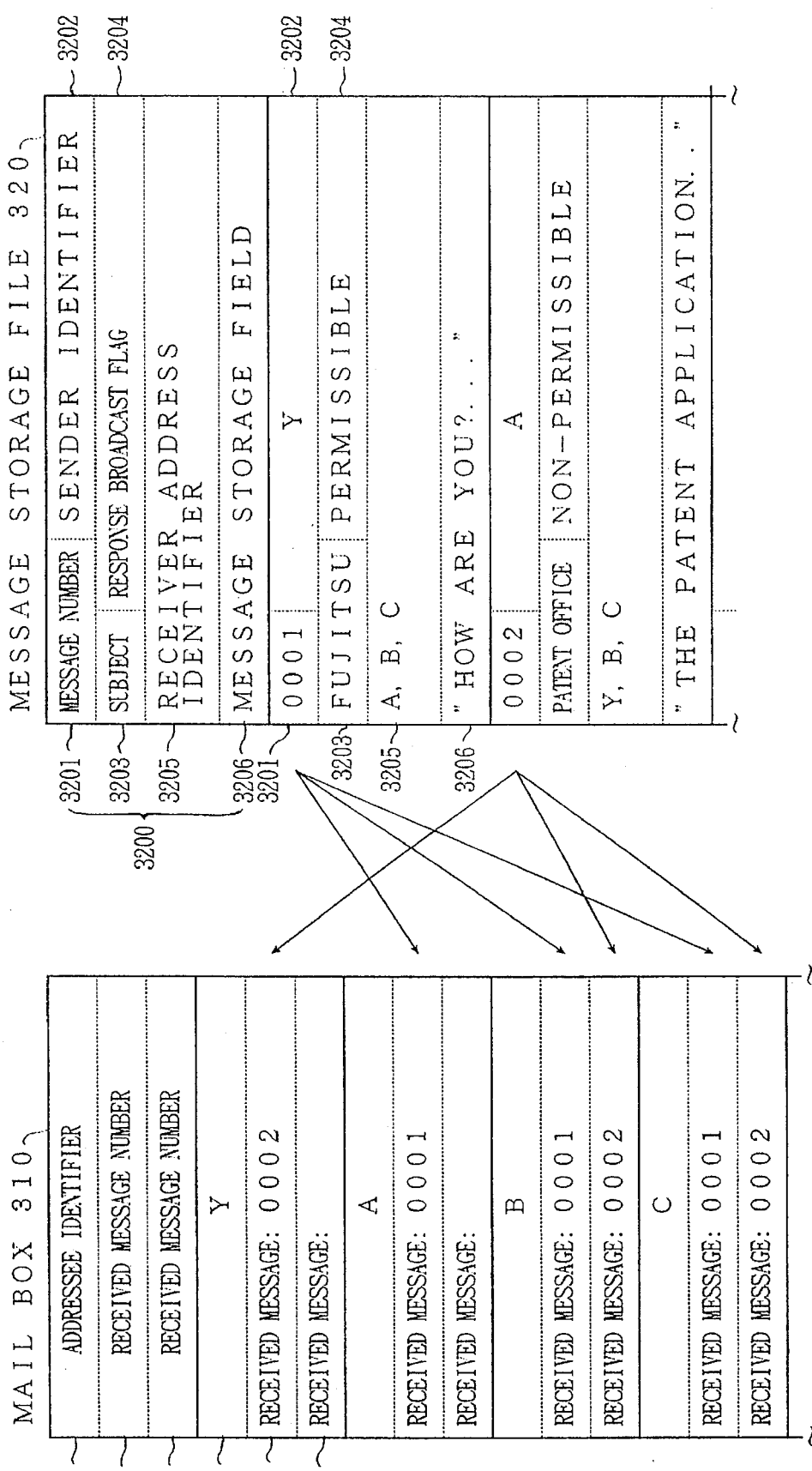
FIG. 4 shows an example of the mail box and the message storage file according to the embodiment shown in FIG. 3.

FIG. 4 shows the configuration of the mail box 310 and the message storage file 320.

As shown in FIG. 4, the mail box 310 manages individually for each addressee the numbers of messages received by the electronic mail system 300, and its one record comprises two separate fields containing an addressee identifier 3101 and a received message number 3102.

The addressee identifier 3101 is an identifier preliminarily assigned to each user to identify an individual user, and the received message number 3102 refers to the number of a message addressed with the addressee identifier 3101 which is stored in the message storage file 320.

The message storage file 320 refers to a file for storing a message received by the electronic mail system 300, and its one record comprises six separate fields containing a message number 3201, a sender identifier 3202, a subject 3203, a response broadcast flag 3204, a receiver address identifier 3205, and a message storage field 3206.

The message number 3201 refers to a specific number assigned to a message received by the electronic mail system 300, for example, a 4-digit serial number as 0001, 0002, etc.

The sender identifier 3202 identifies the sender of the message, the subject 3203 refers to the subject of the message, the response broadcast flag 3204 refers to an identification flag indicating whether or not a response broadcast answering the message is permissible, and the receiver address identifier 3205 refers to an address identifier indicating all addressees of the message.

The message storage field 3206 stores the contents of the message.

For example, If first sender Y requests the electronic mail system 300 to broadcast a message having the message number 0001 to users A, B and C as shown in FIG. 4, and permits a response broadcast answering the broadcast message 0001 replying to the inquiry of the electronic mail system 300, then in each record having A, B, or C as the addressee identifier 3101 in the mail box 310 is registrated the message number 0001 as a received message number 3102.

The response broadcast flag 3204 of the message having 0001 as the message number 3201 in the message storage file 320 is set to "permissible".

When receiver A is notified by the electronic mail system 300 of the reception of the message 0001, he or she requests for the transmission of the message 0001, and receives the message 0001 from the electronic mail system 300. After reading the message 0001, receiver A sends back a broadcast response 0002 to the electronic mail system 300 and requests the system to broadcast the response. At the user's request, the electronic mail system 300 stores the message 0002 in the message storage file 320, and registrates the message number 0002 on each record having Y, B, or C as the addressee identifier 3101 in the mail box 310.

Figure 5:
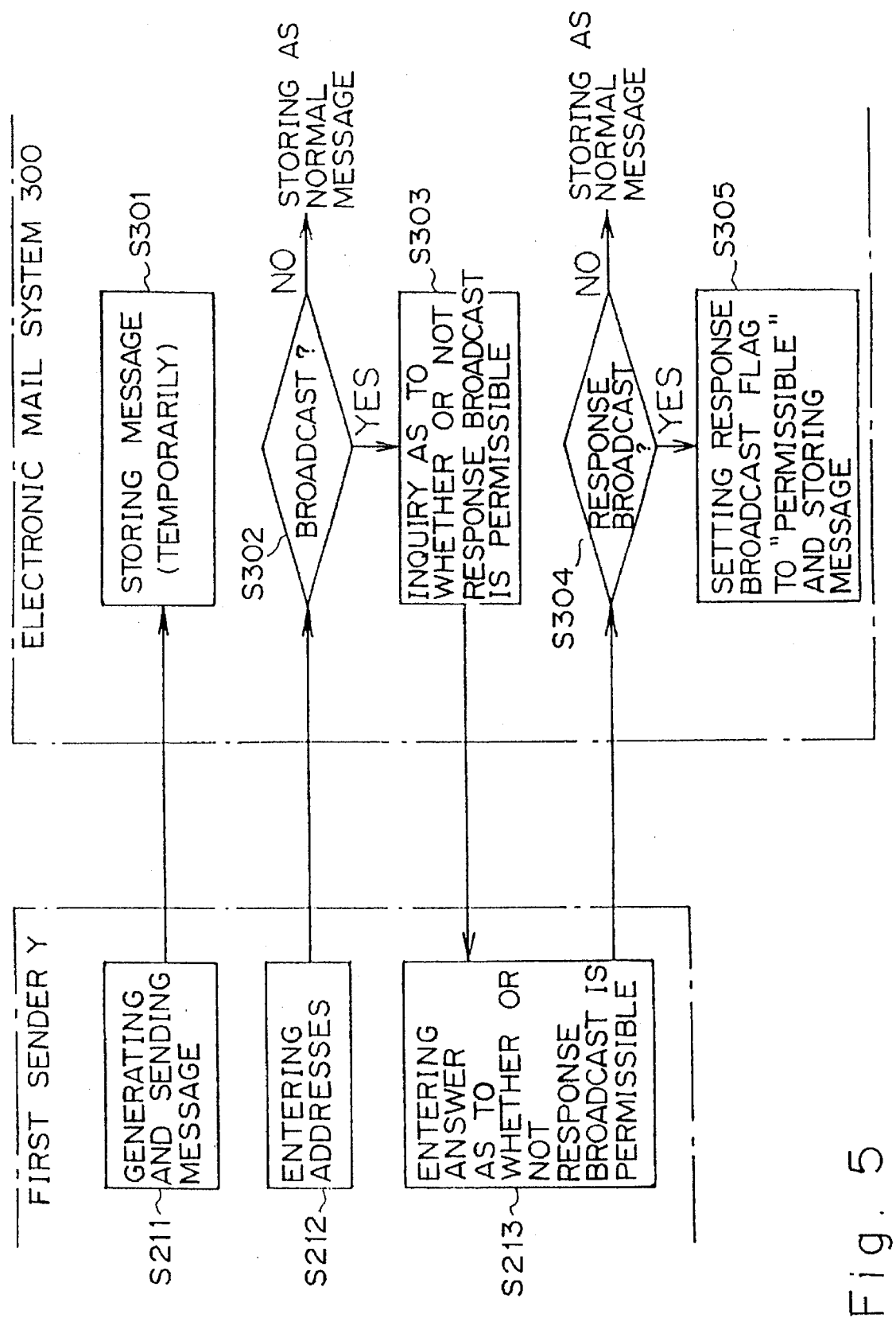
FIG. 5 shows the process of storing a broadcast message according to the embodiment shown in FIG. 3.
Figure 6:
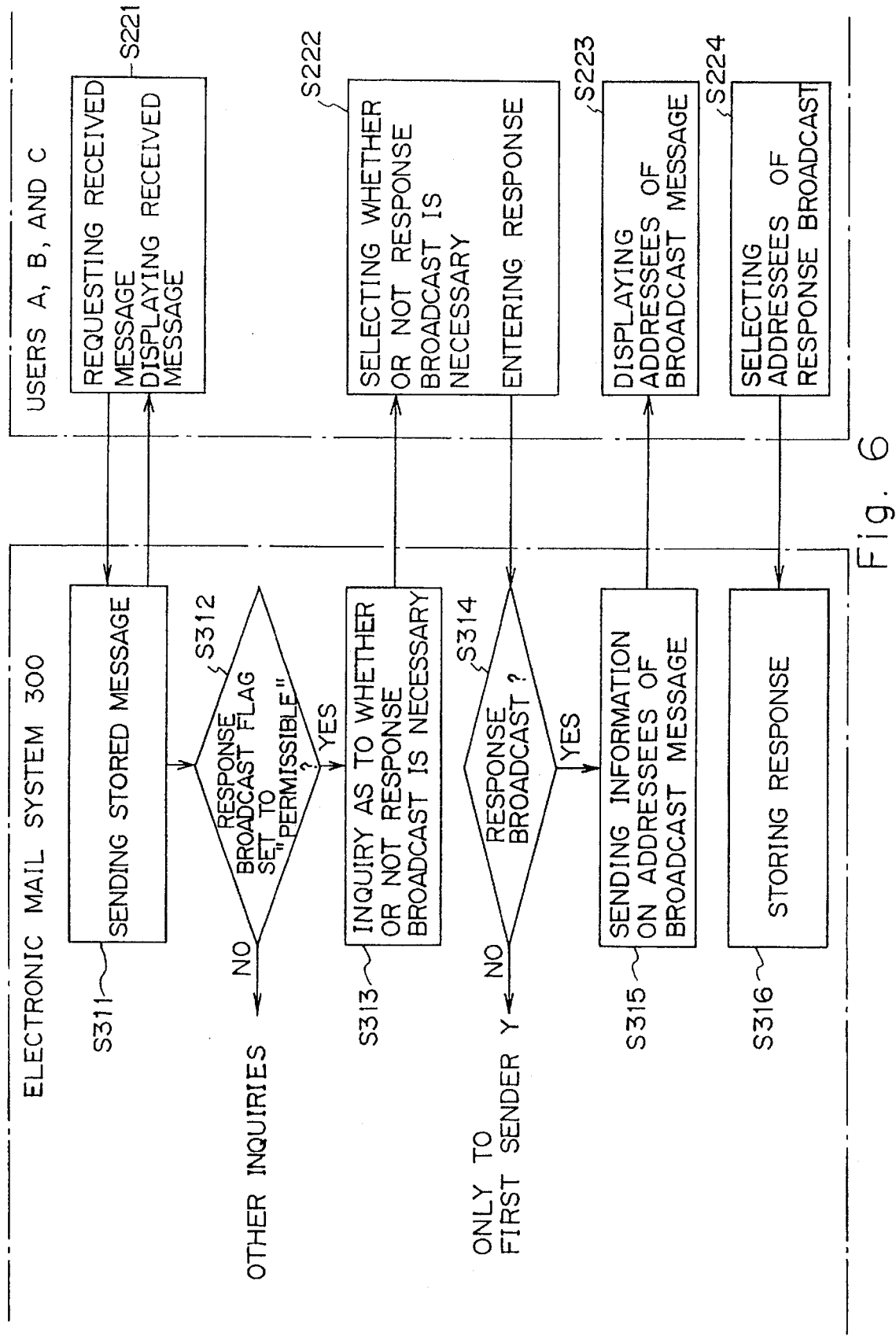
FIG. 6 shows the processes for broadcasting a message and for storing a response according to the embodiment shown in FIG. 3.
Figure 7:
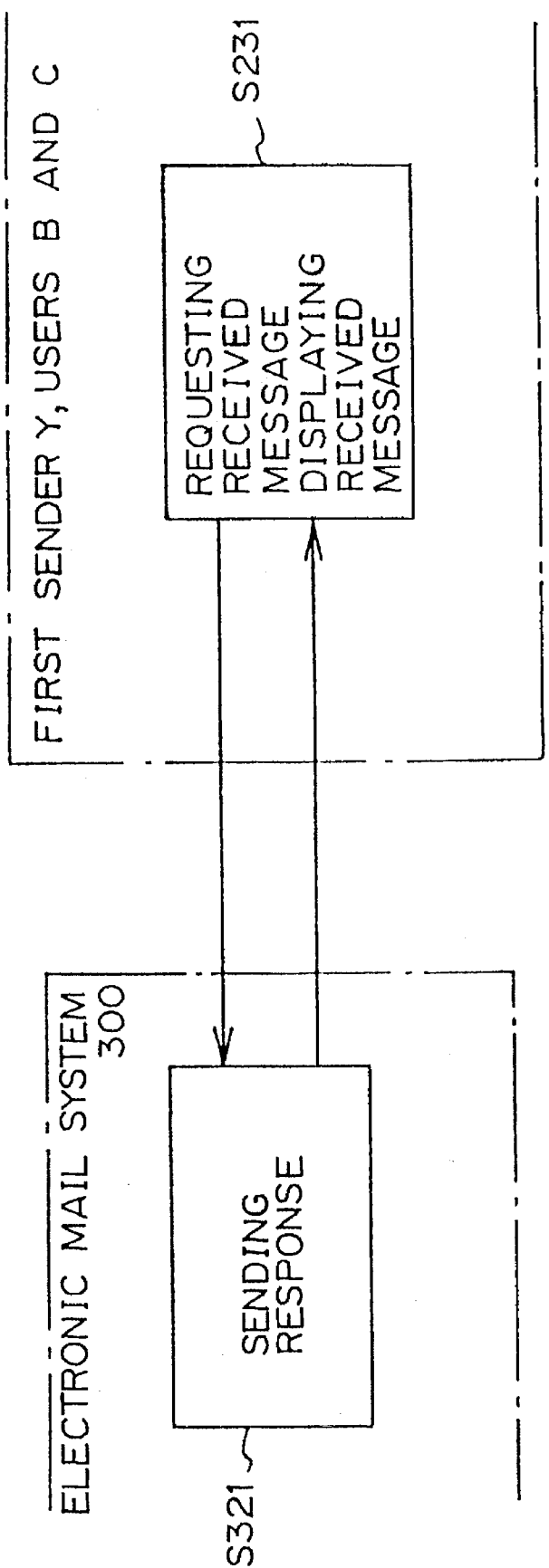
FIG. 7 shows the process of broadcasting a response according to the embodiment shown in FIG. 3.

Next, the process flow for broadcasting a message by the broadcast portion 305 and broadcasting a response by the response broadcast portion 325 is explained by referring to FIGS. 5, 6, and 7.

FIG. 5 is a flowchart of the process corresponding to 1̂ in FIG. 3 showing the steps of generating and sending a message by first sender Y to setting a response broadcast flag 3204 for the message to "permissible" in the message storage file 320. First sender Y generates a message on his or her own terminal unit 200Y, and sends the message to the electronic mail system 300 from the terminal unit 200Y (S211).

On receiving the message, the electronic mail system 300 temporarily stores the message in a working area in its internal memory (S301).

Then, first sender Y generates identification information designating users A, B, and C as addressees of the broadcast message on the terminal unit 200Y, and sends to the electronic mail system 300 the identification information and a request to broadcast the message (S212).

If the broadcast function portion 305 of the electronic mail system 300 determines that the first sender requests to broadcast a message ("Yes" at S302), then it stores in the mail box 310 the addressee identifier 3101 designating the broadcast addresses of the message and sends to the terminal unit 200Y of first sender Y an inquiry as to whether or not a response broadcast answering the broadcast message is permissible (S303).

When the inquiry is displayed on the display of the terminal unit 200Y, he or she selects and enters an answer permitting the response broadcast. The terminal unit 200Y of first sender Y transmits the selected answer to the electronic mail system 300 (S213).

The broadcast function portion 305 receives the inputted answer, sets to "permissible" the response broadcast flag 3204 of the message having the message number 0001 in the message storage file 320 if it determines that first sender Y has permitted the response broadcast ("Yes" at S304), and then stores in the message storage field 3206 the contents of the message from first sender Y stored in the working area in the internal memory at step S301 (S305). Simultaneously, the broadcast function portion 305 sets the sender identifier 3202 to "Y", and the receiver address identifier 3205 to "A, B, C". Then, it registrates 0001 as the received message number 3102 for the addressee identifiers A, B and C in the mail box 310.

If it is determined that there is no broadcast request issued at step 302, or that a response broadcast is non-permissible at step 304, then the message is stored as a normal message.

FIG. 6 is the flowchart of the process from the notification of a broadcast message to the storage of a broadcast response corresponding to 2̂ and 3̂ in FIG. 3. Addressees A, B, and C of the message from first sender Y individually issue through each of their terminal units, 200A, 200B and 200C, a request to receive the message to the electronic mail system 300 and ask the system to send the message addressed to them as being registrated in the mail box 310 (S221).

On receiving a request from addressees A, B and C, the electronic mail system 300 takes out from the message storage file 320 the message 0001 addressed to A, B, and C registrated in the mail box 310, and sends it to terminal units 200A, 200B and 200C of receivers A, B and C (S311).

Thus, the contents of the message 0001 are displayed on the display of each of terminal units 200A, 200B and 200C (S221).

After broadcasting the message 0001 to receivers A, B and C, the broadcast function portion 305 deletes the number 0001 from the received message number of addressees A, B, and C in the mail box 310. Then, it checks whether or not a response broadcast answering the broadcast message is permissible by referring to the response broadcast flag 3204 of the message 0001 in the message storage file 320 (S312). If a response broadcast is permissible ("Yes" at S312), then the system sends an inquiry as to whether or not the response is to be broadcasted to other receivers of the message except for first sender Y to receivers A, B and C (S313).

On receiving the inquiry, receiver A selects an answer to request a response broadcast and enters contents of a response in the terminal unit 200A. Thus, the contents of the response and the request to broadcast the response are sent to the electronic mail system 300 (S222).

According to the request from user A, the response broadcast function portion 325 of the electronic mail system 300 determines that the response is required to be broadcasted ("Yes" at S314), and reads from the receiver address identifier 3205 of the message 0001 identifiers B and C other than A, and sends them to the terminal unit 200A of user A as the information on the addressees of the broadcast response (S315).

Thus, each identifier of B and C is displayed on the display of the terminal unit 200A as the addressee of the broadcast message (S223).

On the display screen, receiver A selects receivers B and C as the addressees of the response broadcast, and sends the identifiers to the electronic mail system 300 (S224).

In response to this, the response broadcast function portion 325 assigns the message number 0002 to the response from receiver A, stores the contents of the response in the message storage field 3206 of the message 0002 in the message storage file 320, and sets the response broadcast flag 3204 of the message 0002 to "non-permissible" and the receiver address identifier 3205 to "Y, B, C" (S316). Then, it registrates the message number 0002 as the received message number 3102 of addressees B and C and first sender Y in the mail box 310.

Contrary to the selection of receiver A, receiver B outputs to the electronic mail system 300 an answer indicating that no response should be broadcasted and a response only to first sender Y from the terminal unit 200B at step S222.

In response to this, the response broadcast function portion 325 determines "No" at step S314, assigns the message number 0003 to the response from receiver B, stores the contents of the response in the message storage field 3206 of the message 0003 in the message storage file 320, and sets the response broadcast flag 3204 to "non-permissible". It also stores the identifier of only first sender Y in the receiver address identifier 3205 of the message 0003. And the message number 0003 is registrated as the received message number 3102 of first sender Y in the mail box 310.

Receiver C outputs to the electronic mail system 300 an answer indicating that no response is required from the terminal unit 200C at step S222. In response to this, the response broadcast function portion 325 determines "No" at step S314 and terminates the receiving process of a response.

FIG. 7 shows the process of broadcasting a response corresponding to 4) In FIG. 3. First sender Y and users B and C issue to the electronic mail system 300 a request to receive a message from the respective terminal unit 200Y, 200B and 200C (S231). Then, the response broadcast function portion 325 takes out the received message 0002 from the message storage file 320 by referring to the received message number 3102 of first sender Y and users B and C in the mail box 310, and sends the message 0002 to the terminal units 200Y, 200B and 200C of first sender Y and users B and C (S321).

Thus, the message 0001 to be sent from user Y to users A, B and C, and the response 0002 to be sent back from user A to users Y, B and C are broadcasted. In this case, a request to broadcast a response is issued by a single broadcast message receiver A, but it is also allowed that requests to broadcast a response are issued by a plurality of broadcast message receivers.

At step S224 shown in FIG. 6, user A selects all the other addressees of the broadcast message 0001 (users B and C) as the addressees of the response 0002. However, the present invention is not limited to this application, and the sender of a response can transmit the response to a part of the other addressees of the broadcast message.

At step 315 shown in FIG. 6, the electronic mail system 300 sends to user A the addressee identifiers B and C, excluding the identifier A among all addressee identifiers A, B and C received from the sender Y of the broadcast message 0001. The configuration can be designed to include the addressee identifier of a sender of a response so that the sender can select himself or herself as an addressee of the response.

At step S315 shown in FIG. 6, the identifier of sender Y of the broadcast message 0001 is not sent to the users. However, it can be sent to each user together with other addressee identifiers as a response broadcast address. As a result, on completing the sending of a broadcast message, the electronic mail system 300 can immediately delete from the message storage file 320 a record storing the broadcast message, thereby effectively utilizing the message storage file 320.

Furthermore, a composition with the steps S315, S223 and S224 omitted in FIG. 6 is also possible. In this composition, a response is immediately sent to the sender of the broadcast message and all addressees of the broadcast message when the electronic mail system 300 receives a request to broadcast the response.

As described above, with the electronic mail system according to the present invention, a receiver of a broadcast message can receive addresses of the broadcast message together with the message. Therefore, the receiver can easily send to the other receivers of the broadcast message his or her own response answering the broadcast message.

What is claimed is:

1. An electronic mail system comprising:
   broadcasting means for sending a message with broadcast addresses received from a first user to users with said broadcast addresses;
   response receiving means for receiving a response to said message from a second user who received said message from said broadcasting means;
   response broadcast function means for sending said broadcast addresses, excluding a broadcast address of said second user, to said second user and for receiving information of a third user selected from among said broadcast addresses by said second user, said second user specifying said third user arbitrarily among users corresponding to said broadcast addresses sent from said response broadcast function means; and
   response sending means for sending to said first user and said third user said response received by said response receiving means.

2. The electronic mail system according to claim 1, wherein
   said response broadcast function means sends said broadcast addresses to a terminal of said second user; and
   said second user selects said third user as a response broadcast address of said response from among said broadcast addresses sent from said response broadcast function means, and said response sending means sending said response to said first user and said third user.

3. The electronic mail system according to claim 1, wherein
   said response sending means sends said response when said broadcasting means receives a permission notification of broadcasting said response to one of said broadcast addresses, said permission notification being sent from said first user.

4. The electronic mail system according to claim 3, wherein
   said first user sends to said broadcasting means said message together with said permission notification.

5. The electronic mail system according to claim 1, wherein
   said response sending means sends said response when said second user requests said response sending means to broadcast said response.

6. An electronic mail system comprising:
   broadcasting means for sending a message with broadcast addresses received from a first user to users with said broadcast addresses;
   response receiving means for receiving a response to said message from a second user who received said message from said broadcasting means;
   response broadcast function means for sending said broadcast addresses to said second user and for receiving information of a third user selected from said broadcast addresses by said second user, said second user specifying said third user arbitrarily among users corresponding to said broadcast addresses sent from said response broadcast function means; and
   response sending means for sending to said first user and said third user said response received by said response receiving means.

7. An electronic mail system comprising:
   broadcasting means for sending a message with destination identifiers received from a first user to users with said destination identifiers;
   response receiving means for receiving a response to said message from a second user who received said message from said broadcasting means;
   response broadcast function means for sending said destination identifiers, excluding an identifier of said second user, to said second user and for receiving an identifier of a third user selected from said destination identifiers by said second user, said second user specifying said third user arbitrarily among users corresponding to said destination identifiers sent from said response broadcast function means; and
   response sending means for sending to said first user and said third user, said response received by said response receiving means.

8. An electronic mail system comprising:

broadcast mail storing means for storing a broadcast mail to plural destination identifiers in each mailbox corresponding to each of said destination identifiers;

reply mail receiving means for receiving a reply mail to said broadcast mail with a destination identifier selected from among said plural destination identifiers, said destination identifier being arbitrarily specified by a receiver of said broadcast mail; and reply mail storing means for storing said reply mail in a mailbox corresponding to said destination identifier received by said reply mail receiving means.

* * * * *